Oct. 17, 1933.  J. F. TOWNSEND  1,930,988
FIELD BOX HEAD
Filed Nov. 18, 1930  3 Sheets-Sheet 1
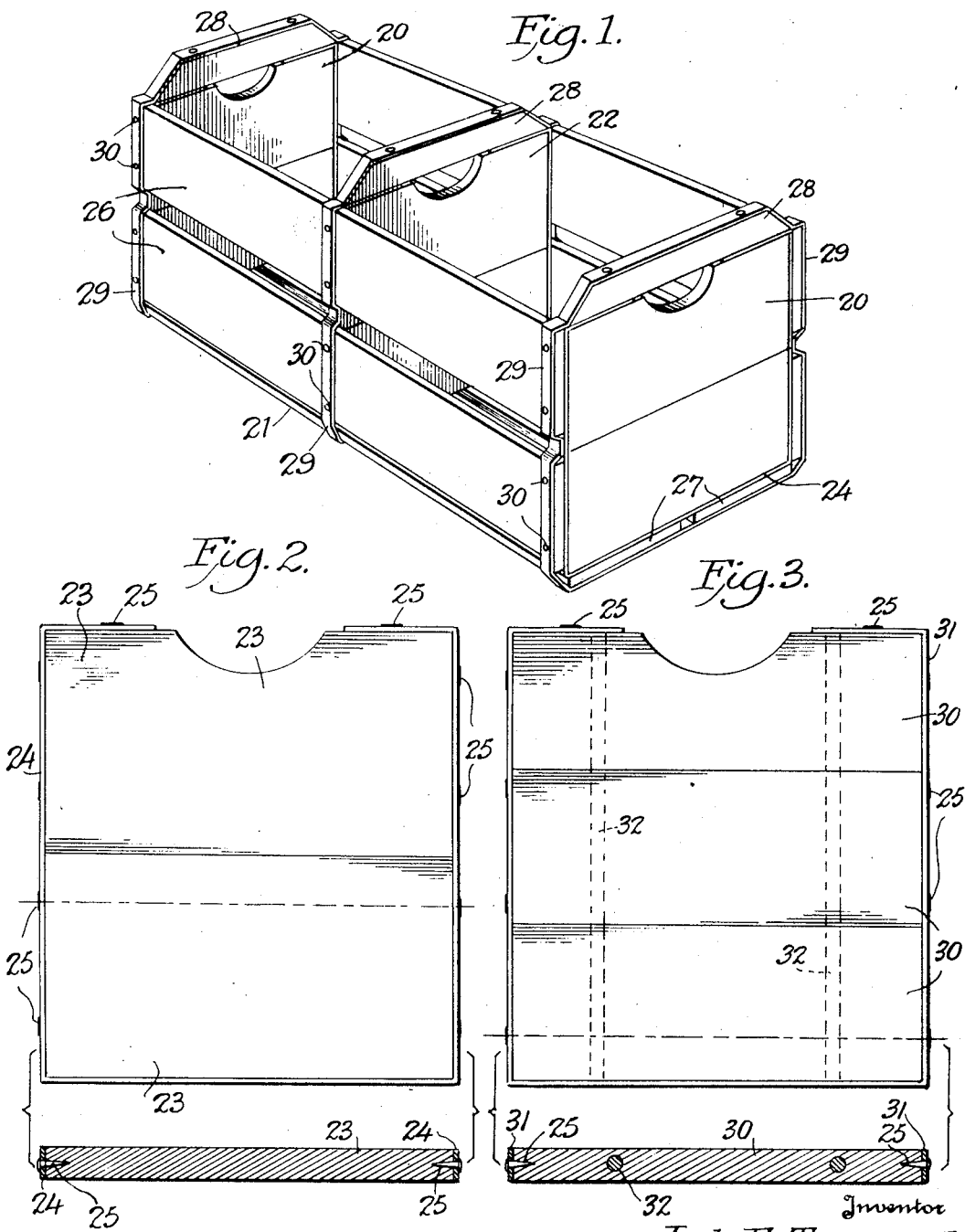
Inventor
Jack F. Townsend,
By
Attorney Oct. 17, 1933.  J. F. TOWNSEND  1,930,988
FIELD BOX HEAD
Filed Nov. 18, 1930  3 Sheets-Sheet 2
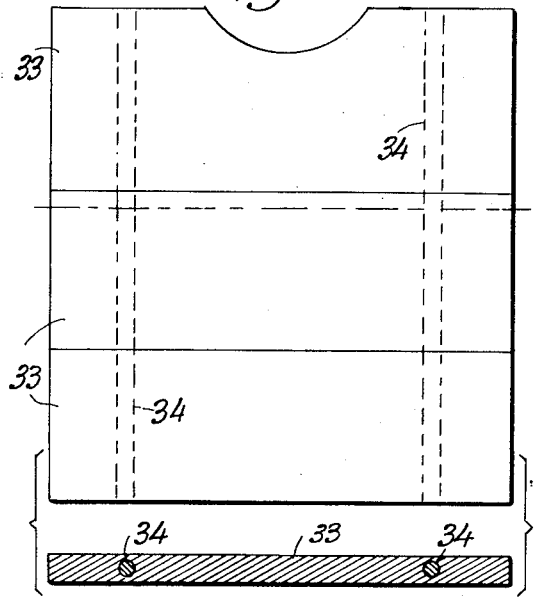
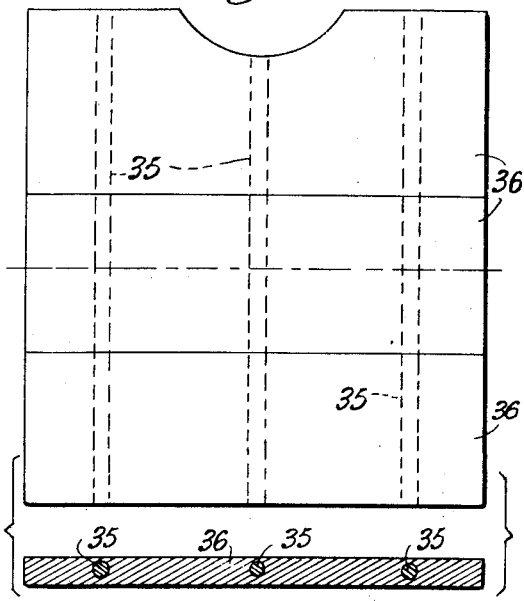
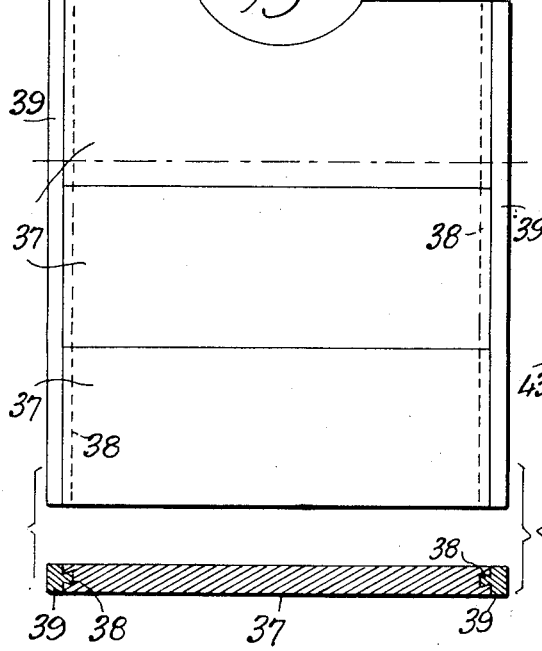
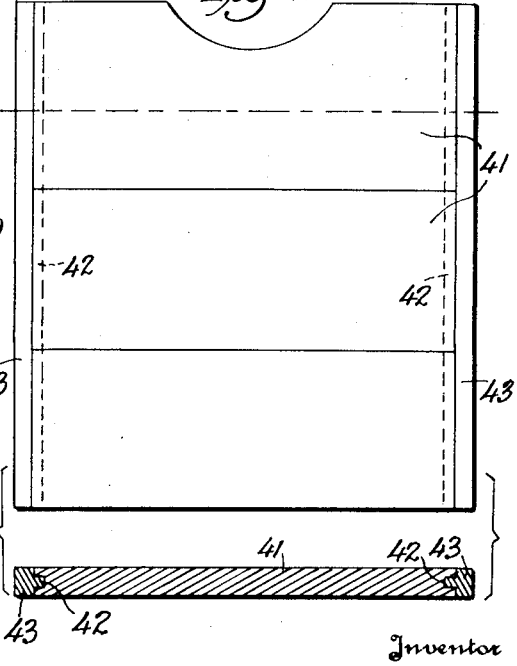
Inventor
Jack F. Townsend,
By
Attorney Oct. 17, 1933.  J. F. TOWNSEND  1,930,988
FIELD BOX HEAD
Filed Nov. 18, 1930    3 Sheets-Sheet 3
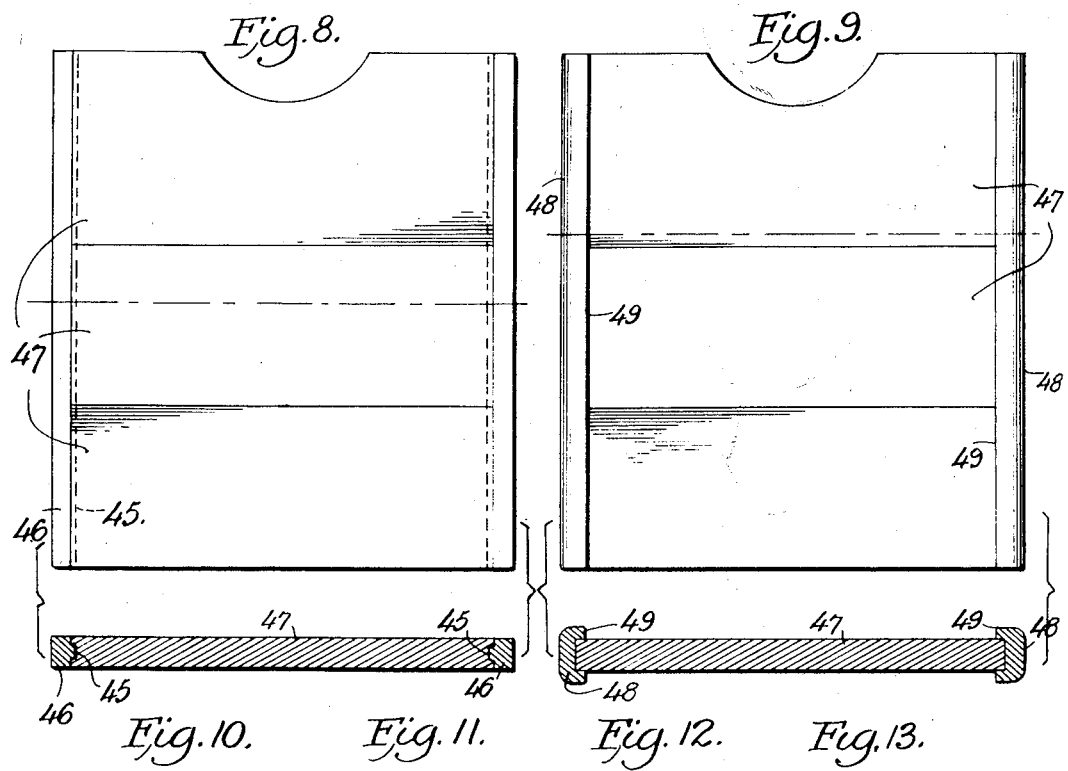
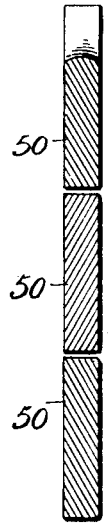
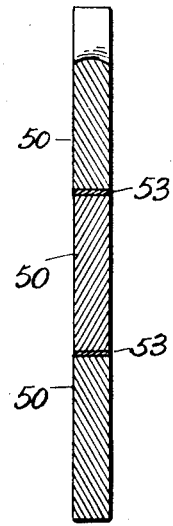
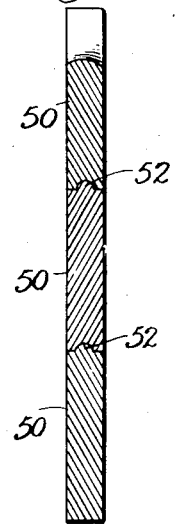
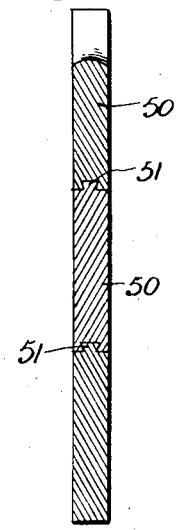
Inventor
Jack F. Townsend,
By
Attorney Patented Oct. 17, 1933

1,930,988

UNITED STATES PATENT OFFICE 1,930,988

FIELD BOX HEAD

Jack F. Townsend, Lake Wales, Fla.

Application November 18, 1930
Serial No. 496,491

2 Claims. (Cl. 217—40)

My said invention relates to a field box head for use by fruit pickers and my general object is to provide a field box end or head that is strong and that is not easily broken or damaged and is so arranged that the construction of the same will not damage fruit put into same and that narrow and short pieces of inexpensive lumber can be utilized. My field box head or end will be unusually strong and can be manufactured and sold at a very reasonable price.

The life of an ordinary field box is relatively short and this is largely due to the kind of field box ends or heads now in use which are easily damaged and broken and in most cases it is not practical to repair these heads without considerable cost, while efforts at repairs frequently cause damage to fruit put in the boxes.

Field boxes are used in the picking of citrus and other fruits and sometimes are used in picking vegetables. The fruit is picked and put into the field box and a full field box containing citrus fruit will weigh approximately 100 pounds. After the fruit is picked and placed in the box the field boxes are loaded on trucks, the boxes being stacked on top of one another and hauled to the packing house which is in most cases several miles distant. The fruit is dumped from the field boxes at the packing house and the empty boxes, because of the necessity for speed in handling at the packing house, receive very rough usage. It is a common practice to take an empty box by one end and drag the box on the other end across the floor of the packing house to the loading platform or to trucks to be loaded and in this practice the field box ends are subjected to considerable abuse and are frequently seriously damaged.

Again in the necessity and practice of speed the empty field boxes are loaded on trucks at the packing house in such manner that the field box heads or ends (such as are commonly in use) on account of their construction are often damaged and broken, and when the trucks arrive at the field (or grove) with the empty field boxes it is the custom to throw the field boxes out on the ground letting them land on end and this damages and breaks the field box heads or ends that are now in use, causing considerable cost in repairs and frequently the loss of a whole field box, because the cost of repairing the ends or heads is so difficult and expensive that it is cheaper to throw away the box. Due to the construction of my field box end or head my type of field box end or head will obviate and largely eliminate this great waste.

Previous efforts to build a field box head that is strong and that will stand up under service have frequently resulted in a type of field box head that when used will, on account of its construction, damage the fruit put into the field box and thus will cause a loss to the grower and the shipper. One of the principal objects of my field box head is to avoid such damage to fruit. My field box head is so constructed that it will not damage fruit under any ordinary use.

It has largely been customary in the past to use what is called a one-piece field box head or end and on account of the necessity of using wide wooden boards which must be clear lumber and which are expensive and scarce because of their width for this type of construction and on account of the nature of the wood a one-piece field box head with the grain of the wood in a vertical position will crack down the grain in seasoning, which weakens the head and eventually causes it to split. Florida and other states have laws covering measures and the contents of packages. Florida has a law providing for the size of a field box. Consequently, when these field boxes are made from one-piece box heads or ends and according to size as provided by Florida State laws, the ends may be of proper measurement at the time when they are made or at the time the field boxes are built up, but subsequently on being exposed to sunshine and rain and other weather conditions the one-piece heads which are placed with the grain of the wood in a vertical position will shrink very seriously in width, which results in an undersized field box. Much of the fruit is bought on the basis of field box measure and therefore when the field box, because of the shrinkage of the field box heads or ends after construction, will reduce the cubic contents of the field box, thus causing the buyer to lose that portion of the said contents of the field box, resulting in the loss of money to him.

My field box head is made from narrow pieces of lumber placed horizontally in the box with their grain parallel to the bottom of the box. Narrow boards will not shrink in width in proportion to wide boards and also boards will not shrink lengthwise; therefore there will be practically no shrinkage in my field box head, thus insuring both buyer and seller a dependable standard size package and also because of its construction my field box head will be much stronger and will last much longer than those now being used. In fact my field box head will be almost non-breakable and will be the means of saving large sums of money in the fruit industry.

Also, my field box head is free from the use of what is known as "corrugated fasteners"; i. e., strips of stiff sheet metal corrugated transversely of their length and driven sidewise into parts to be secured together. These corrugated fasteners are frequently used in the construction of field box heads as a means of holding together rigidly boards placed in either vertical or horizontal position, but as the wood, on account of exposure to sunshine and rain and other weather conditions, will shrink and owing to the strenuous use that the field boxes are put to as the wood shrinks the corrugated fasteners will work loose and will protrude beyond the surface of the field box head and so will be liable to cut and bruise the fruit, causing it to decay and thus causing greater loss and waste. Also, when the corrugated fasteners are driven up into the wood of the field box head in cutting their own way into the wood, this type of fastener leaves a crack or a joint around it, where water can seep in around the fastener, and owing to the fact that there is no ventilation around the fastener, the water seeping and soaking in around the same will cause the wood in the field box head to decay and rot. In many cases these corrugated fasteners will rust and in such event trouble always results. My means of constructing my field box head will obviate and eliminate all possibility of such loss and damage.

Referring to the drawings, wherein similar reference characters indicate similar parts, Fig. 1 is a perspective of a field box of conventional type for fruit pickers;

Fig. 2, an elevation of one form of box head, with a horizontal section placed directly below the elevation for convenience of reference;

Figs. 3 to 8, similar views of modified forms of the invention, and

Figs. 10 to 13 are vertical central sections of a box head, illustrating various forms of joints between the parallel horizontal strips of a box end.

In the drawings, reference character 20 indicates generally box heads in position, in a box 21 for field use, the middle member 22 being ordinarily of the same structure as the members at the opposite ends of the box. The ends in Fig. 1 are shown on a larger scale in Fig. 2 and are each made up of two horizontal pieces of wood 23 (see Fig. 2) connected by a metallic band 24 secured to the strips 23 by nails 25. The bands as here shown extend about the bottom and two sides, being of about the same width as the thickness of the strips 23 and being drawn tight around the outside edges and then nailed at the top and sides. This enables me to build my box head from narrow and short pieces of inexpensive lumber, saving a great deal of waste and a great deal of cost and yet making an unusually strong and substantial field box head.

In making up a box with head such as shown in Fig. 2, three heads such as those at 20, 21 and 22 (Fig. 1) are connected by side strips 26 and bottom boards 27 nailed or otherwise secured to the heads, top pieces 28 are placed over the heads and metallic straps 29 are passed about the box so as to be in the planes of the heads, drawn tight, and then secured by nails 30 or otherwise.

Fig. 3 is like Fig. 2 except that I have here shown a head made up of three strips of lumber 30 held together by a strip 31 of metal nailed or otherwise fastened to the wood, and a pair of dowels 32 passing through the strips of lumber, which makes a stronger head but at a little higher cost.

I may build these heads as shown in Fig. 4, using three or more strips 33 of wood and two vertical dowel pins 34 made from wood or metal or other rigid material. Alternatively I may use three vertical dowels 35 as shown in Fig. 5 or even more to secure the strips 36 together. In building these heads with vertical dowels I may use any suitable means for joining the horizontal pieces together; e. g., such as those shown in Figs. 10 to 13.

Another method of joining the strips of lumber for the head is illustrated in Figs. 6 to 8. In Fig. 6 each of the strips 37 is provided with undercut slots in each of its ends to receive a dovetail 38 on a post 40, which post serves to reinforce the head and to hold the horizontal strips together.

In Fig. 7 a parallel-sided groove is formed at each end of each strip 41 and these grooves receive parallel-sided tongues 42 on posts 43 for the same purpose.

In Fig. 8 the strips of lumber 44 are provided with grooves widest at the outside and narrowing toward the bottom, which grooves receive tapered tongues 45 on posts 46.

The chief advantage in Figs. 6, 7 and 8 of my field box head lies in the presence of vertical posts that hold the horizontal boards together, thus reinforcing the box head and making it very strong. By virtue of the position of the vertical reinforcing posts and the construction of this reinforced field box head it is possible to use narrow strips of lumber in a horizontal position with the small but strong reinforcing post at each end of the horizontal boards, the post in a vertical position, thus making it possible to use trimmings or cut-backs from board lumber that might otherwise be wasted, thus making it possible to produce a very low-priced box head and at the same time a stronger field box head than those now in common use. I want to call particular attention to my method of letting or "gaining" the horizontal boards into the reinforcing post. This helps to make a very strong construction and will prevent any moving or bulging of the pieces of lumber in horizontal position. I may use two or more pieces of lumber in the horizontal position, depending on the size and quality being best suited for the purpose.

Another desirable form of field box head is that in Fig. 9, where the horizontal boards 47 are held together by a post 48 with a groove at its inner side, preferably just wide enough to fit tight over the ends of the boards and so to exclude moisture. The inner corner of the posts, as at 49, projects a little way into the box, but not far enough to touch the fruit or to interfere with proper filling of the box, as is true of certain types of boxes now in use, where a corner piece is set into the angle between the head and the adjacent side, which corner piece takes up so much space that the box can not be filled properly.

As an additional means for holding the horizontal boards together without the use of corrugated fasteners which are liable to damage the fruit and which are undesirable for other reasons as well, I may use dovetail joints between horizontal strips 50 as shown at 51 in Fig. 13, or a tongue-and-groove joint as at 52 in Fig. 12, or a glued joint as at 53, or the strips may be merely butted together without any special connecting joint, or there may even be small cracks left between them as in Fig. 10. If the joints are glued I can rely on this alone to hold the head together, and may dispense with posts, dowel pins, metal bands etc.

It will be obvious to those skilled in the art that many variations may be made in the devices shown in the drawings and described in the specification (the forms shown being for illustration and not for limitation) and therefore I do not limit myself to what is shown in the drawings and described in the foregoing specification, but only as indicated in the appended claims.

Having thus fully described my invention, what I claim is:

1. A field box wall member comprising a plurality of strips of wood arranged with their edges contacting each other, all of said strips having registering holes intermediate their surfaces, the holes being positioned at points interiorly removed from the opposite ends of the strips and being normal to the contacting edges thereof, dowels corresponding in length to the width of the wall member snugly fitted in said holes for uniting the strips, the uppermost strip having a cut-out midway of its length, a linear top piece secured to each wall member and coacting with said cut-out to provide a hand hold, a metal strap secured about the wall member and terminating short of said cut-out and secured thereto, said top piece extending over the ends of the strap to clamp them down.

2. A field box wall member comprising a plurality of strips of wood, said strips having juxtaposed edges and having a hole extending through all the strips from edge to edge of the wall member, said hole being located at a substantial distance from both ends of the strips, a rigid dowel member extending through said hole substantially from edge to edge of the wall member, the uppermost strip having a cut-out midway of its length, a linear top piece secured to each wall member and coacting with said cut-out to provide a hand hold and a metal strap secured about the head, the metal strap terminating short of said cut-out and having its ends clamped by said top piece.

JACK F. TOWNSEND.